Feb. 18, 1958 C. G. PEDERSEN 2,824,010
FLAVOR-CONTAINING MILK CONTAINER TOP
Filed July 29, 1955 2 Sheets-Sheet 1
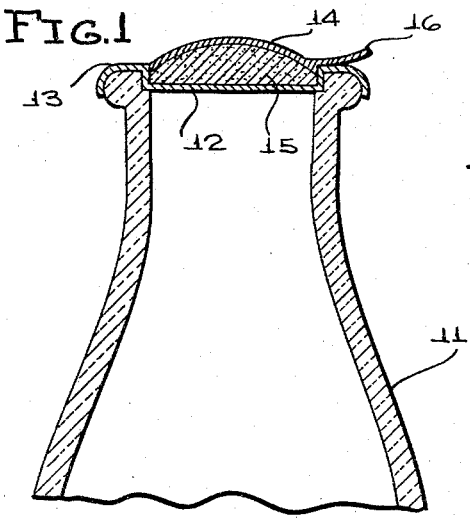
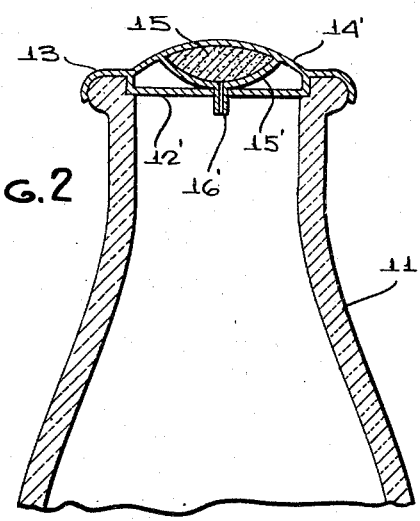
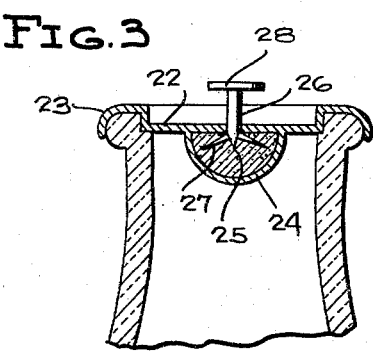
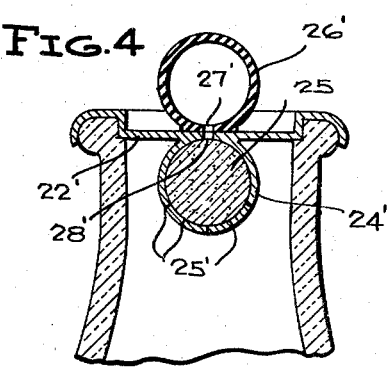
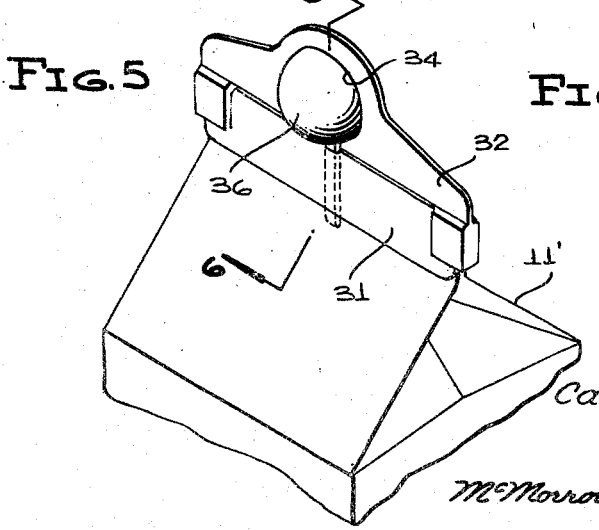
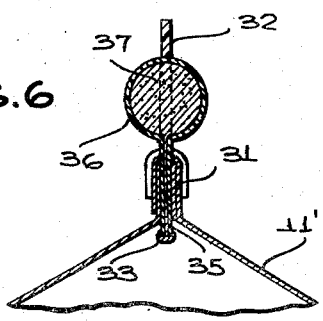
INVENTOR.
Carl G. Pedersen
BY
McMorrow, Berman + Davidson
Attorneys Feb. 18, 1958     C. G. PEDERSEN     2,824,010
FLAVOR-CONTAINING MILK CONTAINER TOP
Filed July 29, 1955     2 Sheets-Sheet 2
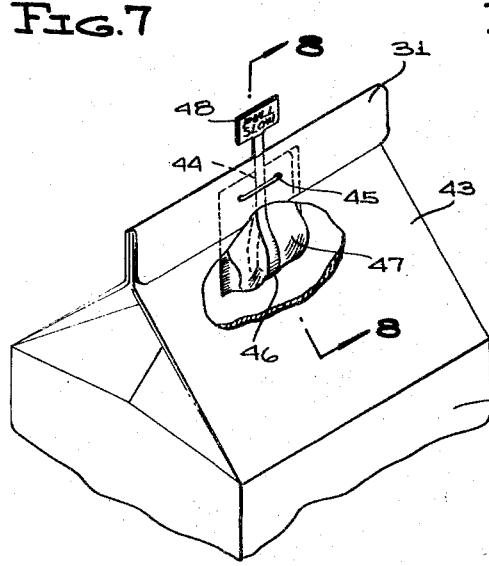
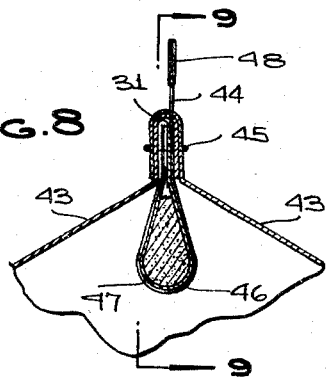
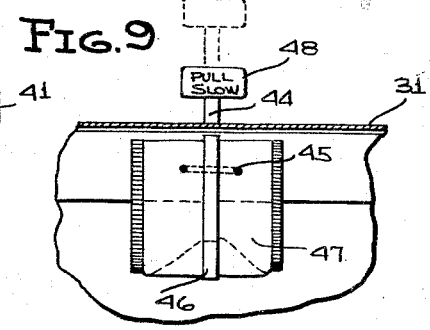
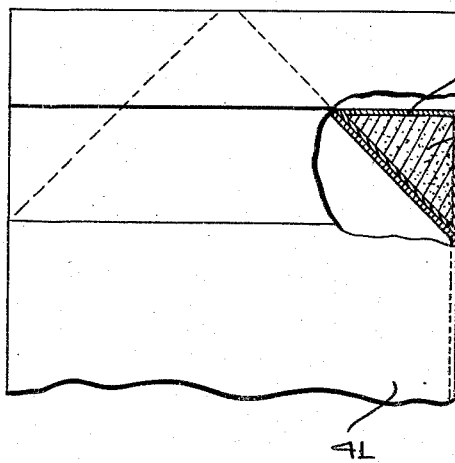
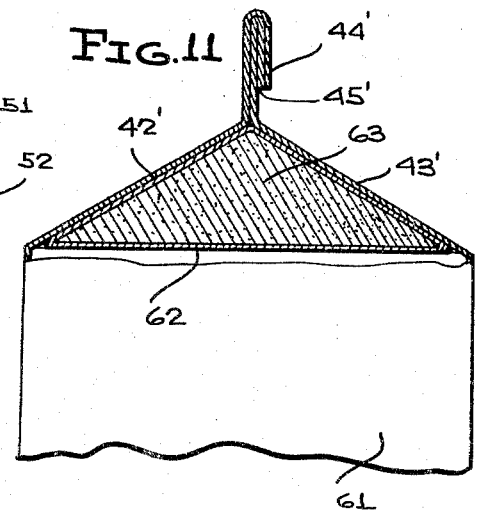
INVENTOR.
Carl G. Pedersen
BY
McMorrow, Berman & Davidson
Attorneys

United States Patent Office 2,824,010
Patented Feb. 18, 1958

2,824,010

FLAVOR-CONTAINING MILK CONTAINER TOP

Carl G. Pedersen, Triumph, Minn.

Application July 29, 1955, Serial No. 525,139

4 Claims. (Cl. 99—171)

This invention relates to containers, and more particularly to a milk container having a flavor-containing top.

The main object of the invention is to provide a novel and improved milk container having a top closure member provided with a receptacle containing flavoring material which may be dispensed into the contents of the milk container, whereby flavored milk may be obtained, the improved container being simple in construction, being inexpensive to manufacture, and being easy to manipulate.

A further object of the invention is to provide an improved milk container having a top closure member provided with a receptacle containing flavoring material which may be dispensed into the contents of the milk container to provide flavored milk, the improved closure device being inconspicuous, being arranged so that it normally is isolated from the milk in the container, and being arranged so that the flavoring material may be emptied into the container responsive to a force exerted on the closure portion of the container.

Further objects and advantages of the invention will become apparent from the following description and claims, and from the accompanying drawings, wherein:

Figure 1 is a vertical cross sectional view taken through the top portion of a milk bottle provided with an improved closure member containing flavoring material, in accordance with the present invention.

Figure 2 is a vertical cross sectional view taken through the upper portion of a milk bottle provided with a modified form of flavoring-containing closure cap according to this invention.

Figure 3 is a fragmentary vertical cross sectional view taken through the top portion of a milk bottle provided with a still further modified form of flavoring-containing closure cap according to this invention.

Figure 4 is a vertical cross sectional view taken through the top portion of a milk bottle provided with a still further modification of flavoring-containing closure cap according to this invention.

Figure 5 is a vertical cross sectional view taken through the top portion of a different type of milk container provided with a flavoring-containing dispensing receptacle according to the present invention.

Figure 6 is a vertical cross sectional view taken on line 6—6 of Figure 5.

Figure 7 is a perspective view of the top portion of another form of milk carton provided with a flavoring-containing, dispensing receptacle according to the present invention.

Figure 8 is an enlarged vertical cross sectional view taken on line 8—8 of Figure 7.

Figure 9 is a vertical cross sectional view taken on line 9—9 of Figure 8.

Figure 10 is a side elevational view partly in vertical cross section, of the top portion of still another form of milk container according to this invention.

Figure 11 is a side elevational view, partly in vertical cross section, taken through the top portion of still another form of milk carton constructed in accordance with this invention.

Referring to the drawings, and more particularly to Figure 1, 11 designates a conventional milk bottle provided with a top cap 12 having the usual clamping flange 13 engageable over the rim of the top of the milk bottle, as shown in Figure 1, said cap 12 being provided with a removable, upwardly convex top disc element 14 defining a cavity therebeneath in which a quantity of powdered flavoring material 15 is disposed. The top disc 14 is provided with a finger tab 16 projecting outwardly over the marginal flange 13 of the cap 12, whereby the disc 14 may be removed to provide access to the powdered flavoring material 15. Thus, to dispense the flavoring material into the milk contained in the bottle 11, the cap 12 is first removed in the usual manner, the disc 14 is then removed by means of the finger tab 16, and the flavoring material 15 is then emptied into the bottle 11.

The removable cap element 14 is preferably made of any suitable flexible material, such as paper or cardboard, similar to the material of which the cap 12 is made, or alternatively, may be made of plastic sheet material, or the like.

Referring now to Figure 2, the bottle 11 is provided with a cap 12' having the peripheral clamping flange 13 engageable over the rim of the bottle top, and is formed with an upwardly convex top wall 14'. In the space between the top wall 14' and the horizontal lower wall of the cap 12' an upwardly concave partition disc 15' is secured, said partition disc thus defining a cavity between the disc 15' and the top wall 14' in which a quantity of flavoring material 15 is disposed. The partition element 15' is centrally provided with a depending, constricted discharge spout 16' which extends centrally through the lower wall of the cap 12', as shown. When pressure is applied to the center portion of the top wall 14' the liquid flavoring material is discharged through the spout 16' into the bottle 11. The members comprising the cap 12' are formed of suitable flexible material, such as cardboard, or the like, and the partition member 15' is formed of similar suitable flexible material, such as relatively thin plastic sheet material, the spout 16' being integrally molded therein. Thus, the downward pressure applied centrally to the top wall element 14' of the cap 12' will be transmitted to the material 15 and to the partition member 15', causing the material to be forced downwardly through the spout 16' into the bottle 11.

In the form of the invention shown in Figure 3, the bottle 11 is provided with a top cap 22 having the peripheral clamping flange element 23 engaging on the top rim of the bottle, the wall of the cap being centrally formed with a downwardly convex partition 24 defining a space between said partition member 24 and the top wall of the cap in which is disposed a quantity of flavoring material 25. The partition member 24 is formed of material similar to the material of which the main portion of the cap 22 is formed, namely, relatively frangible material, such as cardboard or the like.

Designated at 26 is a pin member having its lower portion extending through a central aperture formed in the top wall of the cap 22 and projecting into the cavity containing the material 25. The lower end of the pin member 26 is formed with a plurality of downwardly and outwardly inclined spur elements 27. The top end of the cap 22 is provided with a flat head 28 of substantial area. When a downward force is suddenly applied to the head 28, the pin element 26 descends and the spur elements 27 rupture the bottom wall member 24, causing the flavoring material 25 to be dispensed into the bottle 11.

In the form of the invention shown in Figure 4, the cap, designated at 22' is formed with the depending bulb 24' of cardboard, or other material similar to the material comprising the main portion of the cap, the bulb 24' being scored or otherwise weakened across its lower portion, as designated by the scores 25', whereby the bulb 24' is readily frangible when internal pressure is developed therein. Centrally secured to the top surface of the main wall of cap 22' is a flexible bulb 26', of rubber, or other similar elastic material, said bulb being formed with a bottom passage 27' which communicates with a top passage 28' formed in the bulb 24'. The bulb 24' contains a quantity of flavoring material, shown at 25. When squeezing pressure is applied to the elastic top bulb 26', the pressure is transmitted to the interior of the bulb 24', causing the bulb to burst, and discharging the flavoring material 25 into the bottle 11.

In the form of the invention shown in Figure 5, 11' designates a milk carton having the crimped top portion 31 in which is secured a vertical rigid plate member 32. Centrally mounted in the plate member 32 is the depending dispensing spout 35 which is integrally formed with a bulb 36 mounted in an aperture 34 provided in the upper portion of plate member 32. The bulb 36 is formed of suitable elastic material, such as rubber or the like, and contains a quantity of flavoring material 37. The lower end of spout 35 is normally sealed by a wax coating 33. When squeezing force is applied to the flexible bulb 36, wax coating 33 is broken, causing the flavoring material to be discharged through the depending spout 35 into the container 11'.

Referring now to Figure 7, 41 designates a milk carton having the usual frangible top structure comprising the upstanding crimped member 31 defined between top walls 43, 43. Slidably secured in the intermediate portion of member 31 is a flexible band 44 to the top ends of which is secured a gripping tab 48 and which is formed with a loop 46 inside the carton between the walls 43, 43. Secured in the band, and in the crimped member 31, as by a staple 45, is a frangible bag 47 containing flavoring material, said bag being embraced by the loop 46. When tab 48 is pulled upwardly, the frangible bag 47 is forced against crimped member 31 and bursts, releasing the flavoring material.

In the form of the invention shown in Figure 10, a milk carton 41 has secured in its top portion an auxiliary container 51 of triangular cross section, as shown, said auxiliary container having a quantity of powdered flavoring material 52 therein. The container 51 is of readily frangible material, such as cardboard or the like, so that when the top of the container 41 is opened, the container 51 may be detached therefrom and may be opened to discharge the flavoring material 52 into the milk container 41.

In the form of the invention shown in Figure 11, the milk carton, designated at 61 is similar to the carton 41' of Figure 7 and has the sealing flaps 44' and 45' which are secured together and folded over, as illustrated to seal the carton. Secured in the triangular space beneath the top walls 43' and 42' of the carton is a receptacle 62 of triangular cross section, as shown, containing a quantity of flavoring material 63, said receptacle 62 being secured in any suitable manner, such as by the use of suitable adhesive, to the bottom surfaces of top walls 42' and 43'. When the carton 61 is opened, as by separating the top flaps 44' and 45', the receptacle 62 may be removed, and said receptacle 62 may be opened and its contents may be discharged into the milk carton 61.

While certain specific embodiments of an improved milk container provided with a flavoring-containing top closure member have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a milk container, a removable hollow, flexible closure cap mounted on said container and a flexible dispensing receptacle containing relatively fluent food flavoring material mounted in said cap and having a depending, relatively restricted discharge spout extending through and below said cap and arranged to discharge said flavoring material into the container responsive to force exerted on said closure cap.

2. In combination, a milk container, a flexible removable closure cap mounted on said container, a flexible dispensing receptacle containing relatively fluent food flavoring material mounted in said cap, and a relatively restricted dispensing conduit connected to the lower portion of the receptacle and extending through the cap, said receptacle being arranged to discharge said flavoring material into the container through said conduit responsive to force exerted on said closure cap.

3. In combination, a milk container, a flexible removable closure cap mounted on said container, a flexible dispensing receptacle containing liquid food flavoring material mounted in said cap, and a constricted discharge spout connected to the lower portion of the receptacle and extending downwardly through the cap, said receptacle being arranged to discharge said flavoring material into the container through said discharge spout responsive to force exerted on said closure cap.

4. In combination, a milk container, a flexible removable closure cap mounted on said container, a flexible top wall on said cap, defining a compartment between said top wall and said cap, a flexible dispensing receptacle mounted in said compartment and containing relatively fluent food flavoring material, and a constricted discharge spout connected to the lower portion of the receptacle and extending downwardly through the cap, said receptacle being arranged to discharge said flavoring material into the container through said discharge spout responsive to force exerted on said top wall.

References Cited in the file of this patent

UNITED STATES PATENTS

| | | |
|---|---|---|
| 1,933,468 | Abbot | Oct. 31, 1933 |
| 2,034,067 | Stone | Mar. 17, 1936 |
| 2,076,132 | Rose | Apr. 6, 1937 |
| 2,214,202 | Odell et al. | Sept. 10, 1940 |
| 2,275,567 | Smith | Mar. 10, 1942 |
| 2,469,204 | Peters | May 3, 1949 |
| 2,576,834 | Hengsgen | Nov. 27, 1951 |
| 2,617,733 | Hengsgen | Nov. 11, 1952 |
| 2,764,156 | Simon et al. | Sept. 25, 1956 |

FOREIGN PATENTS

| | | |
|---|---|---|
| 716,477 | France | Oct. 6, 1931 |